UNITED STATES PATENT OFFICE.

PAUL CARL BEIERSDORF, OF ALTONA, GERMANY.

PROCESS OF TREATING GUTTA-PERCHA OR BALATA.

SPECIFICATION forming part of Letters Patent No. 508,560, dated November 14, 1893.

Application filed April 19, 1893. Serial No. 471,051. (No specimens.)

*To all whom it may concern:*

Be it known that I, PAUL CARL BEIERSDORF, of Altona, in the Kingdom of Prussia, in the German Empire, have invented a new and useful Process of Treating Gutta-Percha or Balata for the Purpose of Obtaining Uniform Qualities Thereof, of which the following is a specification.

Gutta-percha and balata in the crude condition in which they come to market contain various percentages of balsamic or soft resinous matter. For the various uses to which these substances are put it is desirable that they should be deprived of some of said matter but that more or less of said matter should be retained in them according to the purposes or uses to which they are to be put. While it has not been found possible to deprive the said substances of a fixed percentage of the said balsamic or resinous matter it is easy to deprive them of the whole of such matter.

The object of this invention is to overcome the above difficulty and to produce a quality of gutta-percha or balata containing a desired percentage of said balsamic or resinous matter. The gutta-percha and balata may thus be converted into distinct grades or qualities containing such percentages of the balsamic or resinous matter as may best suit the uses to which they are respectively to be put.

Having first ascertained the percentage of resinous matter which is most suitable to the end in view, a suitable quantity of a cheaper gutta-percha or balata, richer in resinous matter than the proposed quality, is taken and deprived of the whole of its resinous contents by solution in alcohol, ether-alcohol or other hydrocarbon suitable for the purpose. This quantity of purified gutta-percha or balata is then mixed with a proportion of gutta-percha or balata also of cheaper quality, by reason of its richer contents of resinous matter, in such a ratio that the percentage of resinous matter in the resulting mixture is the same as that necessary in the quality of gutta-percha desired. For instance, when I wish to produce a quality of gutta-percha or balata with twenty-five per cent. of resinous matter I deprive a certain quantity of one quality of the whole of its resinous matter; then I ascertain of another quantity of the same or other suitable quality, by solution, the percentage of resinous matter contained in it. If the latter is, for instance, fifty-five per cent., I mix one hundred parts of it with one hundred and twenty parts of the gutta-percha of which the whole resinous matter is deprived. The required quantity for mixing with the one hundred parts of the fifty-five percentage gutta-percha will be found after the formula 25 : 100 : : 55 : 220—the whole quantity.

When I have several quantities of different percentages of resinous matter I deprive the cheapest one which has the greatest percentage of the whole resinous matter.

What I claim as my invention is—

The process herein described of treating gutta-percha and balata for the purpose of obtaining uniform qualities thereof, which consists in depriving a certain quantity of gutta-percha or balata of the whole of its resinous contents by subjecting it to the action of a solvent of said contents, and mixing with the so deprived quantity a proper quantity of gutta-percha or balata which is richer in resinous matter than the quality desired.

PAUL CARL BEIERSDORF.

Witnesses:
 A. SCHAPER,
 G. THÖM.